Jan. 6, 1959     W. R. HARRY     2,867,788
OBJECT LOCATING SYSTEMS
Filed Feb. 27, 1943     3 Sheets-Sheet 1
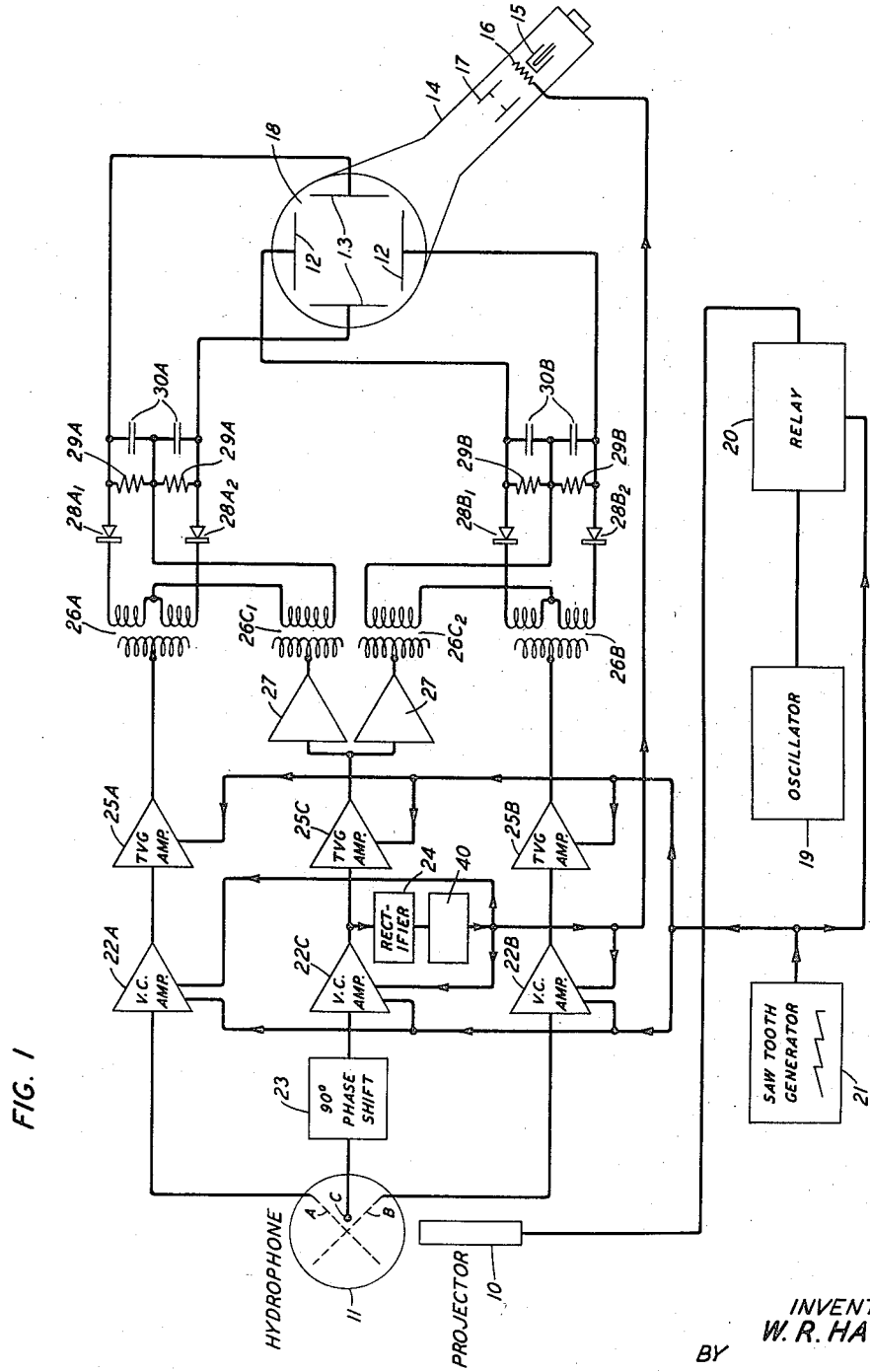
FIG. I
INVENTOR
W. R. HARRY
BY
Walter C. Kiesel
ATTORNEY

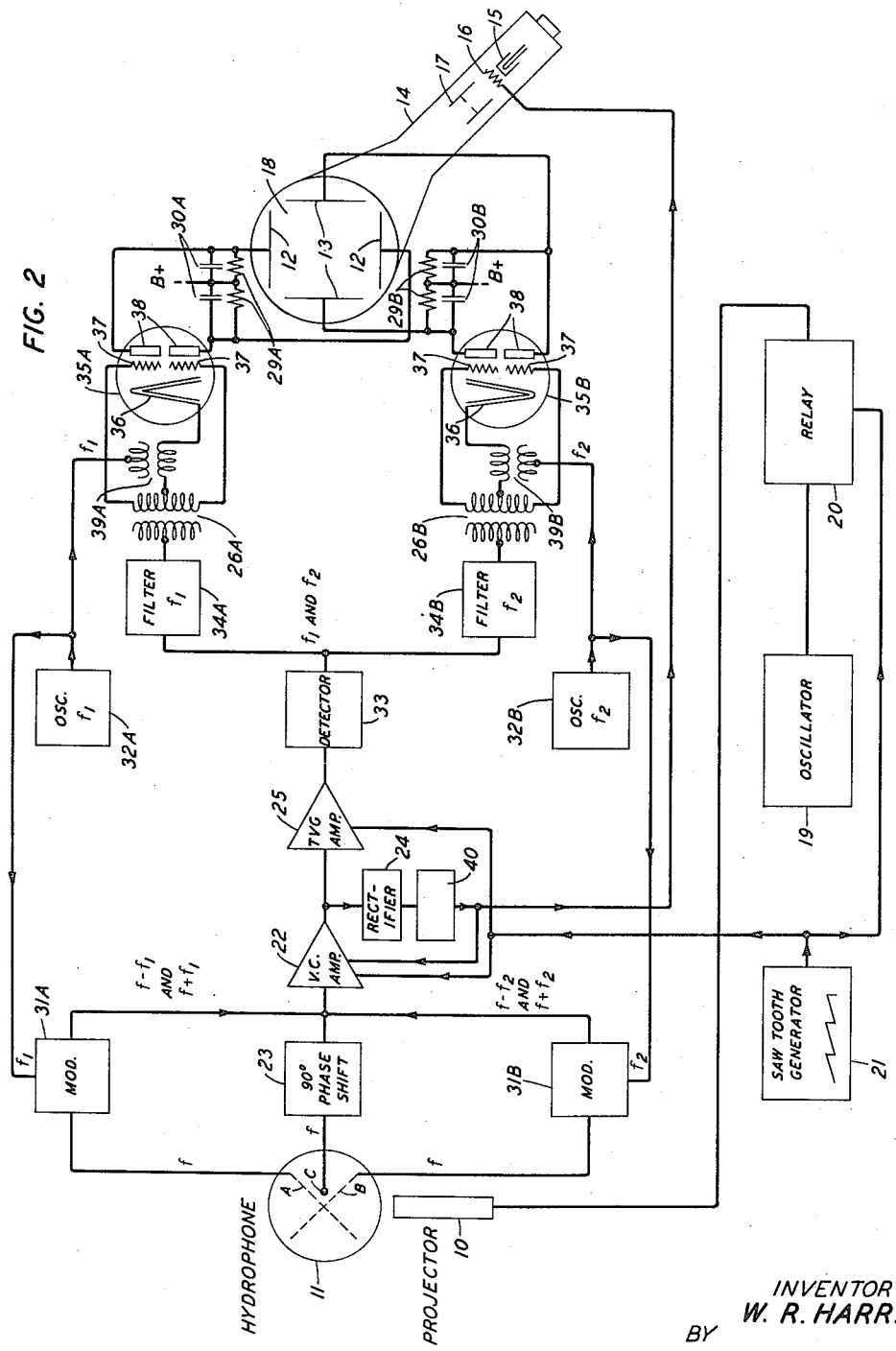

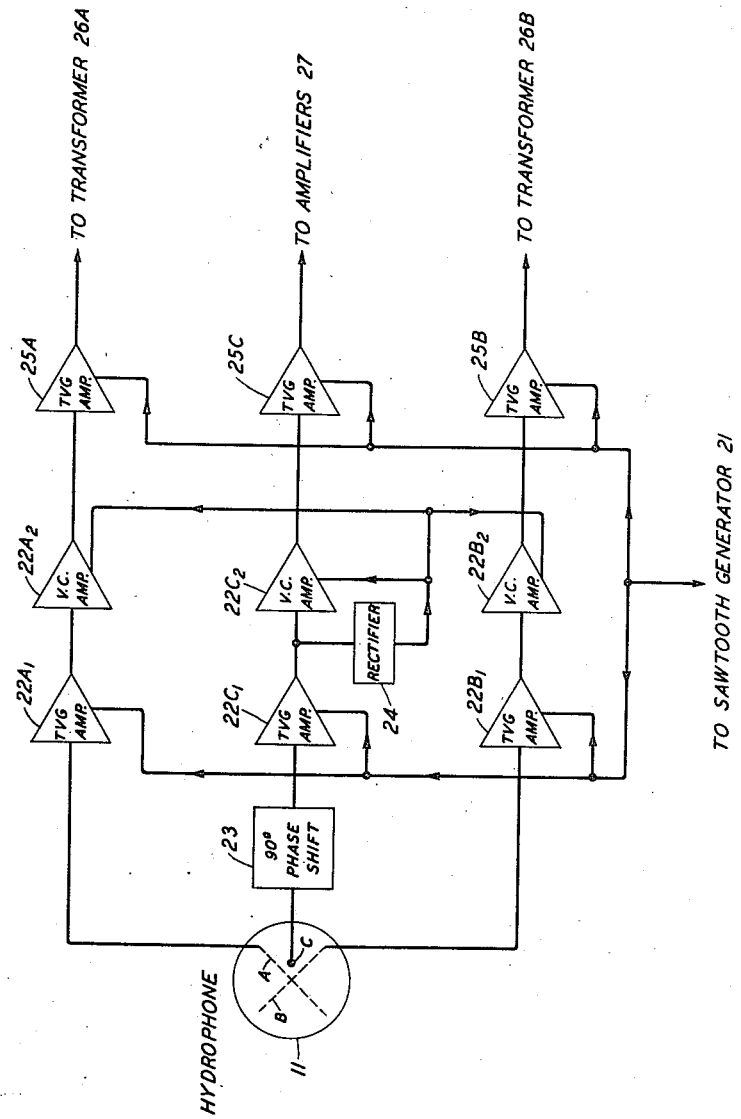

2,867,788
OBJECT LOCATING SYSTEMS

William R. Harry, Summit, N. J., assignor to Bell Telephone Laboratories, Incorporated, New York, N. Y., a corporation of New York Application February 27, 1943, Serial No. 477,353

10 Claims. (Cl. 340—6)

This invention relates to object locating systems and more particularly to systems of the supersonic echo ranging type for determining the location of submarines and other submerged objects.

One object of this invention is to enable and facilitate the accurate determination of both the bearing and distance of a submerged object, such as a submarine, with respect to a reference region.

Another object of this invention is to translate signals reflected from an object in an echo ranging system into a single visual indicia or image accurately indicative of the location of the object with respect to a reference point.

A further object of this invention is to simplify object locating systems adapted to indicate both azimuth and distance of the object being located.

In one illustrative embodiment of this invention, an echo ranging submarine locating system comprises a supersonic projector adapted to project compressional waves of substantially uniform intensity in all directions horizontally, a hydrophone having a predetermined directional response characteristic and thus capable of distinguishing, by the magnitude of its response, between reflected waves or echoes arriving thereat at different angles of incidence, an indicating device, such as a cathode ray device, and a resolving circuit associating the hydrophone with the indicating devices.

In accordance with one feature of this invention, the output of the hydrophone is translated into two crossed electric fields of such relative intensity that the resultant is indicative of the angle of incidence of the reflected waves or echoes upon the hydrophone and of such absolute intensity that the amplitude of the resultant is accurately proportional to the distance of the object at which the reflected waves originated, from the hydrophone. The fields thus produced when established between the deflector plates of a cathode ray device result in the creation of a spot upon the fluorescent screen of the device, the location of which spot with reference to the center of the screen and an axis thereof is indicative of both the bearing and distance of the object with respect to the hydrophone.

More specifically, in accordance with one feature of this invention, the output of the hydrophone is controlled, for example amplified, in such manner as to substantially compensate for decreases in the strength of the reflected wave or echo with distance between the object and the hydrophone and for variations in the strength of the echo due to variations in the size and configuration of the object. The controlled or amplified signal is then controlled or amplified further in such manner that the resultant level is proportional to the time interval between the propagation of the pulse by the projector and the receipt of the corresponding reflected signal or echo by the hydrophone. This interval, of course, is proportional to the distance between the reflecting object and the hydrophone. The signal resulting is then resolved as described above and applied in the form of two potentials across the deflector plates of the cathode ray device.

The invention and the above-noted and other features thereof will be understood more clearly and fully from the following detailed description with reference to the accompanying drawing, in which:

Fig. 1 is a circuit diagram of an echo ranging object locating system illustrative of one embodiment of this invention;

Fig. 2 is a circuit diagram of a modification of the system shown in Fig. 1; and Fig. 3 is a circuit diagram illustrating another modification of the system shown in Fig. 1.

Referring now to the drawing, the system illustrated in Fig. 1 comprises a supersonic projector 10, such as disclosed in the application Serial No. 489,334, filed June 2, 1943, of Walter D. Goodale, Jr. and Thomas J. Pope, now Patent No. 2,434,648 granted January 20, 1948, capable of propagating compressional waves with substantially uniform intensity simultaneously in all directions about its longitudinal axis, which axis is vertical when the projector is in operation in a submarine locating system. Adjacent and advantageously coaxial with the projector 10 is a hydrophone 11 which may be of the construction disclosed in the application Serial No. 479,084, filed March 13, 1943, of Thomas J. Pope, now Patent No. 2,405,604 granted August 13, 1946. The hydrophone 11 comprises three translating elements or microphones A, B and C, the element C having a substantially non-directional response characteristic and the elements A and B being bidirectional, having substantially cosine directivity and having their axes orthogonally related. As pointed out in the above-noted application of Thomas J. Pope, the directional pattern of the three elements in combination comprises four cardioidal lobes in space quadrature about the longitudinal axis of the hydrophone.

The output of the hydrophone 11 is supplied, in a manner described hereinafter, to the deflector plates 12 and 13 of a cathode ray device 14, the plates being in space quadrature as shown. The cathode ray device 14 comprises an electron gun 15, a control electrode or grid 16 thereadjacent, a focussing anode 17 and a fluorescent screen 18 all axially aligned, the anode 17 concentrating the electron stream emanating from the gun 15 into a beam passing, in the absence of potentials upon the deflector plates, centrally of the space bounded by the plates.

In brief, in the operation of the system, the projector 10 is energized periodically to propagate supersonic time spaced pulses, the corresponding reflections or echoes from an object are received by the hydrophone and the signals corresponding to the reflections and echoes are translated into two potentials which are applied between the deflector plates 12 and 13, the signal being resolved in such manner that the resultant field produced between the deflector plates corresponds in direction and amplitude to the direction and distance of the object with respect to the hydrophone.

More specifically, power is supplied to the projector 10 by an oscillator 19 in the form of short pulses as determined by a relay 20 which is controlled by a sawtooth generator 21. The pulse length may be, for example, of the order of .001 to .01 second. In systems intended for the location of submarines, the frequency of the oscillator advantageously is of the order of 20 to 40 kilocycles per second and the relay is actuated at intervals of the order of one second. The particular oscillator frequency and timing of the pulses employed in any particular system will be determined by a number of factors including the attenuation of the propagated signal by sea water, the size of the object to be located and the intended range of the system. The oscillator frequency and pulse timing noted above are satisfactory for systems intended for the location of submarines and other objects of comparable size and having a range of at least 500 yards under average water noise conditions and greater distances under favorable conditions.

The outputs of the hydrophone elements A and B are supplied directly to amplifiers 22A and 22B, respectively, and the output of the element C is fed to the amplifier 22C by way of a 90-degree phase shifting device 23, the purpose of which will be described hereinafter. The several amplifiers are controlled so that the outputs thereof are substantially independent of the size and configuration of the reflecting object and its distance from the hydrophone and in such manner that all three amplifiers have the same gain at all times.

Specifically, the three amplifiers 22 are controlled by the saw-tooth generator 21, in ways known in the art, so that their gain is a minimum at the instant power is supplied to the projector 10 and increases with time at a predetermined rate to compensate for the reduction in intensity of a reflection or echo received by the hydrophone from the object with increasing distance between the object and the hydrophone. The amplifiers 22 are controlled further by way of a rectifier 24 connected to the output of the amplifier 22C and having a differential or threshold device 40 associated therewith. The input to the amplifier 22C from the unit C is independent of the direction of the reflecting object with respect to the hydrophone 11 and because of the time-gain control by virtue of the saw-tooth generator 21 the output of this amplifier is substantially independent also of the distance between this object and the hydrophone. The rectifier 24 and threshold device 40 result in the application to the three amplifiers 22 of a control potential which is proportional to the size and configuration of the reflecting object so that the gain of these amplifiers is controlled accordingly. Stated in another way, the reflections or echoes picked up by the microphone element C are amplified to a constant amplitude independent of the intensity of the reflections or echoes and the several amplifiers have equal gain at all times as noted heretofore.

The individual outputs of the amplifiers 22A and 22B are proportional, of course, to the pick-ups of the respective microphone elements A and B. As a result of the gain control action described above, the outputs of the several amplifiers 22 are each independent of the size and configuration of the reflecting object and of the distance between this object and the hydrophone. Consequently, the vectoral resultant of the outputs of the amplifiers 22A and 22B likewise is independent of the size and configuration and distance noted, that is, mathematically stated $$\sqrt{P_A^2 + P_B^2} = K$$

where $P_A + P_B$ are the outputs of the amplifiers 22A and 22B, respectively, and K is a constant. Hence, if these outputs were translated suitably into potentials applied to the deflector plates 12 and 13, the electron beam would be deflected in the direction corresponding to the bearing of the reflecting object with respect to the hydrophone and the amplitude of the deflection would be the same for all objects irrespective of their distance from the hydrophone.

The several amplifiers 22 are connected to respective balanced time variation gain amplifiers 25A, 25B and 25C, controlled by the saw-tooth generator 21 and designed, in ways known in the art, so that the gain thereof increases linearly with the time elapsing after the transmission of a pulse by the projector 10. Hence, the greater the time interval between the projection of a pulse by the projector 10 and the receipt at the hydrophone 11 of the corresponding reflection or echo, the greater will be the output of the amplifiers 25. The time interval noted is proportional, of course, to the distance between the reflecting object and the hydrophone, so that the amplitude of the output of the amplifiers 25 is proportional to this distance.

Each of the amplifiers 25A and 25B is connected to the primary winding of the corresponding one of two balanced transformers 26A and 26B. The amplifier 25C is connected to transformers $26C_1$ and $26C_2$ through isolation amplifiers 27 which serve to prevent feedback between the outputs of the two transformers 26A and 26B by way of the transformers $26C_1$ and $26C_2$.

The secondary winding of transformer 26A is connected across the deflector plates 13 by way of a pair of balanced half-wave rectifiers 28A having associated therewith a low-pass filter having a quick decay characteristic. In one form such filters may comprise suitable equal shunt resistances 29A and by-pass condensers 30A provided as shown. Similarly, the secondary winding of transformer 26B is connected across the deflector plates 12 by way of a pair of balanced half-wave rectifiers 28B and a low-pass filter defined, for example, by suitable equal resistances 29B and by-pass condensers 30B associated as shown. The secondary windings of the transformers 26A and 26B are center tapped and a corresponding one of the secondary windings of transformers $26C_1$ and $26C_2$ is connected between the center tap and the mid-point of the associated resistances 29.

As noted hereinabove, the microphone elements A and B are bidirectional and have substantially cosine directivity, that is, the output thereof is proportional to the angle of incidence of the reflection or echo thereon. The output voltage of each of the elements A and B is 90 degrees out of phase with the output voltage of the non-directional microphone element C. For reflections or echoes incident upon either element A or B in one direction the output voltage of this element will lead the output voltage of the element C by 90 degrees and for incidence in the opposite direction the output voltage of either element A or B will lag 90 degrees behind that of the element C. The phase-shifting device 23 shifts the phase of the output voltage of the element C, so that, as will be apparent, the output of the amplifier 25C is either in phase or 180 degrees out of phase, depending upon the angle of incidence of the reflections or echoes on the hydrophone, with the outputs of the amplifiers 25A or 25B.

Because of the connection of the secondary windings of transformers $26C_1$ and 26A, the voltage applied across one of the rectifiers, for example $28A_1$, is the sum of two voltages and that applied across the other of the rectifiers, $28A_2$, is the difference of two voltages. Inasmuch as the microphone element A has cosine directivity and the microphone element C is substantially non-directional, the voltage applied across one rectifier will be proportional to $(1 + \cos \theta)$, where $\theta$ is the angle of incidence of the reflection or echo upon the element A and that applied across the other rectifier will be proportional to $(1 - \cos \theta)$. One rectifier receives voltage when the reflection or echo is incident at zero degrees upon the microphone element A and the other rectifier receives voltage for the incident angle of 180 degrees. For angles of incidence intermediate 0 and 180 degrees, the voltages applied to the two rectifiers combine so that the resulting voltage impressed between the deflector plates 13 is proportional to the cosine of the incidence angle.

Similarly, the outputs of the microphone elements B and C are resolved in the circuit including the rectifiers $28B_1$ and $28B_2$ to impress between the deflector plates 12 a voltage proportional to the cosine of the angle of incidence of the reflection or echo upon the microphone element B. The resultant of the two potentials impressed between the pairs of deflector plates corresponds in direction to the location of the object from which the reflections emanate, with respect to the hydrophone.

Also, because of the operation of the amplifiers 22 and 25 as described heretofore, the resultant is related in amplitude to the distance between the object and the hydrophone. Hence, the electron beam of the cathode ray device 14 will be deflected by the resultant field to produce on the fluorescent screen 18 a spot, the location of which with reference to the center of the screen is an accurate indicia of both the bearing and distance of the reflecting object with respect to the hydrophone.

The system illustrated in Fig. 2 is basically similar and functionally equivalent to that disclosed in Fig. 1 differing therefrom principally in the manner and instrumentalities by which the signals picked up by the hydrophone are resolved into the two crossed fields between the deflector plates 12 and 13. The resultant of these fields, as in the system illustrated in Fig. 1, corresponds in direction and amplitude to the bearing and distance with respect to the hydrophone of the object from which the reflections or echoes emanate.

In the system illustrated in Fig. 2, the outputs of the two bidirectional, cosine directively microphone elements A and B are fed to two balanced modulators 31A and 31B, respectively, where they are modulated by different frequencies supplied by oscillators 32A and 32B and all but the side-band frequencies are eliminated. Advantageously, the modulating frequencies are of low frequency. For example, the signal frequency $f$, i. e., the frequency of the reflections or echoes, may be of the order of 20 to 40 kilocycles, the frequency $f_1$ of the oscillator 32A may be of the order of 6 kilocycles, and the frequency $f_2$ of the oscillator 32B may be of the order of 10 kilocycles. The signal and modulating frequencies are balanced out or eliminated in known ways so that the output of each modulator contains only the sum and difference frequencies of the signal and modulating frequencies.

The outputs of the modulators 31A and 31B are combined with the output of the microphone element C which is shifted 90 degrees in phase and which constitutes a carrier for the sideband signals emanating from the modulators. The resultant combined signal is then passed through the volume controlled amplifier 22 and thence to the time variation gain amplifier 25. These amplifiers, similarly to the corresponding amplifiers in the system shown in Fig. 1, are time controlled by the saw-tooth generator 21 and are designed to have predetermined gain characteristics. That is, the amplifier 22 is effective to compensate for variations in the strength of the reflections or echoes picked up by the hydrophone 11, due to distance between the reflecting object and the hydrophone and to size and configuration of the object, and the amplifier 25 has its gain increasing substantially linearly with time from the instant of the propagation of the pulse by the projector 10.

The amplified combined signal is then fed to a detector 33 where the modulating frequencies $f_1$ and $f_2$ are detected and these frequencies are supplied to transformers 26A and 26B through selective filters 34A and 34B, respectively, which pass only the modulating frequencies $f_1$ and $f_2$, respectively. The detected and filtered signals are then demodulated and rectified and impressed between the deflector plates 12 and 13.

The demodulating and rectifying circuit associated with the transformer 26A and deflector plates 12 includes an electron discharge device 35A having two essentially identical triode units each of which includes the cathode 36, a control electrode or grid 37 and an anode 38. Energy from the oscillator 32A, corresponding in phase and amplitude to that supplied to the modulator 31A by the oscillator 32A, is supplied to the input circuit of the device 35A by way of a transformer 39A, the secondary winding of which is connected between the cathode 36 and the mid-point of the secondary winding of the transformer 26A. The anodes 38 are connected to the deflector plates 12 by way of a suitable low-pass filter having a quick decay characteristic, which in one form includes suitable equal resistors 29A and by-pass condensers 30A provided as shown. Suitable means, not shown, are provided to bias the control electrodes or grids 37 so that the device 35A operates as a demodulator.

Similarly the detected signal from filter 34B is resolved into a direct current potential impressed across the deflector plates 13 by a demodulating and rectifying circuit including the electron discharge device 35B and input transformer 39B.

The outputs of the filters 34A and 34B, it will be seen comprise the respective modulating frequency $f_1$ or $f_2$ modified in phase and amplitude in accordance with the relations between the signals supplied to the modulators 31A and 31B by the respective oscillators and the signals supplied to the modulators by the respective associated bidirectional translating element A or B.

The phase relation and amplitude of the two varying voltages impressed upon the input circuit of each of the discharge devices 35A and 35B determine the polarity and magnitude, respectively, of the direct current potential impressed between the respective deflector plates 12 and 13. Advantageously the amplitude of the voltage supplied to each input circuit by way of the associated input transformer 39A or 39B is of the order of but not less than the amplitude of the detected signal voltage supplied by way of the transformers 26A and 26B.

Because of the action of the amplifiers 22 and 25, the potential between each pair of deflector plates 12 and 13 is related to the output of the respective translating element A or B such that the magnitude of each potential is proportional to both the angle of incidence of the reflection or echo upon the hydrophone and the strength of the reflection or echo signal. Hence, the direction and resultant of the two potentials are related respectively to the direction of the reflecting object with respect to the hydrophone and to the distance of the object from the hydrophone. The electron beam of the device 14, therefore, will be deflected accordingly to produce on the screen 18 a spot indicative of the bearing and distance of the reflecting object with respect to the hydrophone.

Although both systems have been described with reference to the determination of the location of a single object, it will be understood, of course, that these systems are capable of locating simultaneously a number of objects within the range of the projector and hydrophone, each object being located by a correspondingly located spot on the fluorescent screen 18 of the cathode ray device. The relative intensity of these spots may be controlled, if desired, to correspond to the relative intensities of the corresponding reflections by connecting the control electrode or grid 16 to the rectifier 24 and threshold device 40, the output of which as noted heretofore is proportional to the reflection intensity with variations due to distance of the object compensated for so that the intensity of each spot is related to the size and configuration of the object, i. e., the greater the size of the object the brighter is the spot.

In the systems described thus far, the compensation for variations in reflection intensity due to distance and for variations due to size and configuration of the reflecting object is effected by controlling the gain of a single amplifier or set of amplifiers. These two compensating actions may be obtained by using separate amplifiers in which case less stringent design requirements are placed upon the amplifiers involved. One suitable arrangement of such separate amplifiers for use in a system of the configuration illustrated in Fig. 1 is shown in Fig. 3.

As illustrated in Fig. 3, the outputs of the microphone elements A, B and C are supplied to identical time variation gain amplifiers $22A_1$, $22B_1$ and $22C_1$ respectively, controlled by the saw-tooth generator 21 and having such time-gain characteristic as to substantially compensate for variations in intensity of the reflections or echoes with distance between the reflecting object and the hydrophone. The outputs of the several amplifiers $22A_1$, $22B_1$ and $22C_1$ are then supplied to identical gain controlled amplifiers $22A_2$, $22B_2$ and $22C_2$, respectively. The latter amplifiers are controlled by the rectifier 24 so that the gain thereof is such as to compensate for variations in reflection intensity due to size and configuration of the reflecting object. The outputs of the last-mentioned amplifiers are then supplied to the respective time variation gain amplifiers 25 which operate in the same manner as described heretofore in connection with Fig. 1 to relate the outputs thereof to a time base so that their outputs are proportional to the distance between the reflecting object and the hydrophone.

It will be noted that in Fig. 3, the amplifiers $22A_2$, $22B_2$ and $22C_2$ are forwardly controlled by the rectifier 24. It will be understood that the amplifiers 22 in the systems illustrated in Figs. 1 and 2 may be controlled in like manner instead of by the feedback and threshold device arrangement shown in these figures.

In the systems shown in the several figures, the compensation for variations in the intensity of the reflections due to distance and size and configuration of the reflecting object is effected by variable gain amplifiers. It will be understood, of course, that the compensation may be obtained by use of other transmission control elements such, for example, as variable loss devices controlled in like manner to the variable gain amplifiers described heretofore. In all cases, of course, it is necessary that phase and gain or loss equality in the three channels associated with the microphone elements be accurately maintained throughout the system up to the final rectifiers by way of which the deflector plates 12 and 13 are supplied with the deflecting potentials.

It will be noted that in Fig. 1, the rectifiers 28 are shown as of the dry disc type and in Fig. 2 the rectifiers 35 are shown as electron discharge devices. Either type of rectifier may be employed in either system, the type employed in any particular case being largely a matter of choice dependent upon the impedance desired.

In some cases, it may be desirable to obtain an audible signal whenever an additional reflecting object comes within the field of the system. For example, the system will indicate the presence of known objects, such as surface vessels, within its field and it may be desired to have an alarm whenever an unknown object, such as a submarine enters this field. This desideratum may be realized by mounting each system in such manner, e. g., in association with a gyro compass, that the spot indicia on the screen represent absolute bearing and the spots representative of known objects thus are fixedly located. These spots can be masked by appropriate screens external to the device 14. A photoelectric cell mounted opposite the fluorescent screen 18 and sensitive to spots produced thereon, will respond to any additional spots appearing on the screen and may be utilized, thus, to control a suitable alarm system.

Although specific embodiments of the invention have been shown and described, it will be understood that they are but illustrative and that various modifications may be made therein without departing from the scope and spirit of the invention as defined in the appended claims.

What is claimed is:

1. An echo ranging object locating system comprising a compressional wave projector, means for energizing said projector to propagate time spaced pulses, a detector responsive to reflections of said pulses and having a predetermined directional response characteristic, a visual indicating device, and a resolving circuit connecting said detector to said indicating device and effective to resolve the response of said detector into two angularly related electric fields at said device for actuating it, said resolving circuit comprising a first amplifying means associated with said detector and having a predetermined gain characteristic such that the gain thereof varies substantially proportionately inversely to the variation in intensity of said reflections with distance between said detector and the source of the reflections and a second amplifying means connected between said first amplifying means and said indicating device and having a predetermined time-gain characteristic such that the gain thereof varies proportionally to the time interval between the propagation of a pulse by said projector and the arrival of the corresponding reflection at said detector.

2. A submarine locating system comprising a supersonic compressional wave projector, means for energizing said projector to produce time spaced pulses, a hydrophone responsive to reflections of said pulses and having a predetermined directional response characteristic, a cathode ray oscillograph having angularly related deflecting means, and means for converting the output of said hydrophone into two potentials at said deflecting means related in amplitude so that the resultant corresponds in direction and is proportional in magnitude to distance of the source of the reflections with respect to said hydrophone, said converting means comprising a first amplifying means associated with said hydrophone and having a gain increasing substantially in proportion to the decrease in intensity of the reflections with increasing distance between said source and said hydrophone, and a second amplifying means connected between said first amplifying means and said deflecting means and having a gain increasing substantially in proportion to the time interval between the propagation of a pulse by said projector and the receipt of the corresponding reflection by said hydrophone.

3. An echo ranging object locating system comprising a substantially non-directional wave energy pulse projector, a detector responsive to reflections by an object of the pulses propagated by said projector and having a predetermined directional response characteristic, a cathode ray device having two pairs of deflector means in space quadrature, and a resolving circuit connecting said detector to said deflector means and effective to convert the reflections detected by said detector into potentials between said deflector means the resultant of which corresponds in direction and magnitude to the bearing and distance respectively of said object with respect to said detector, said resolving circuit comprising a first amplifier means associated with said detector and having a gain increasing substantially proportionately to the decrease in intensity of said reflections with increasing distance between said object and said detector and a second amplifier means connected between said first amplifier means and said deflector means and having a gain increasing substantially linearly with time from the instant of propagation of a pulse by said projector.

4. An echo ranging object locating system comprising a substantially non-directional wave energy pulse projector, a detector responsive to reflections by an object of the pulses propagated by said projector and including a substantially non-directional translating element and two angularly related translating elements having similar directional response characteristics, an indicating device the indication of which represents the resultant of two electric fields angularly related, and means for converting the output of said detector into two potentials at said indicating device related in amplitude to both the bearing and distance of the reflecting object with respect to said detector, said converting means comprising a first amplifier means associated with said detector and effective to substantially compensate for the decreasing intensity of reflections arriving at said detector with increasing distance between said object and said detector, a second amplifier means associated with said first amplifier means and having a time-gain characteristic such that the gain thereof increases substantially in proportion to the time interval between the propagation of a pulse by said projector and arrival of the corresponding reflection at said detector and means for resolving the output of said second amplifier means into two potentials supplied to said indicating device.

5. An object locating system comprising a substantially non-directional wave energy pulse projector, a detector responsive to reflections by an object of pulses propagated by said projector and including a substantially non-directional translating element and two orthogonally related translating elements having substantially related cosine directivity, a cathode ray device having two pairs of deflector electrodes in space quadrature, and means for resolving the output of said detector into two potentials each of which is impressed between a corresponding pair of said deflector electrodes and the resultant of which corresponds in direction and amplitude to the bearing and distance respectively of the reflecting object with respect to said detector, said resolving means comprising 90-degree phase shifting means connected to said non-directional element, a first amplifier means connected to said non-directional and orthogonally related translating elements and having a predetermined time-gain characteristic such that the gain thereof increases at a rate in proportion to time elapsing between the propagation of a pulse by said projector and the receipt of the corresponding reflection by said detector to substantially compensate for decreases in reflection intensity with increase in distance between said object and said detector, a second amplifier means associated with said first amplifier means and having a gain increasing with time, means for energizing said projector, first amplifier means and second amplifier means in synchronism, means for combining the output of said non-directional element as amplified by said first and second amplifier means with the output of each of said two elements as likewise amplified and for resolving each resultant signal into a direct current potential related in amplitude and polarity to the distance and direction respectively of said object with respect to said detector, and means for impressing each direct current potential between a corresponding pair of said deflector electrodes.

6. A submarine locating system comprising a substantially non-directional supersonic compressional wave projector, means for energizing said projector to propagate time spaced pulses, a hydrophone responsive to reflections of said pulses by a submarine and including a substantially non-directional microphone and two bidirectional microphones having orthogonally related cosine directive response patterns, means for shifting the output of said non-directional microphone 90 degrees in phase, two balanced amplifiers each connected to a corresponding one of said bidirectional microphones and having a gain characteristic such as to substantially compensate for the decreasing intensity of the reflections at said hydrophone with increasing distance between said submarine and said hydrophone, a third amplifier connected to said non-directional microphone and having a gain characteristic such as to compensate for variations in the strength of said reflections due to said distance, means energized by the output of said third amplifier to control the output of said two and third amplifiers to compensate for variations in the strength of said reflections with size and configuration of the submarine, similar time variation gain amplifiers associated with said two and third amplifiers and having a gain increasing substantially linearly with time, means for operating said projector, two and third amplifiers and time variation gain amplifiers in synchronism, means combining the output of the time variation gain amplifier associated with said third amplifier in sum and difference relation with the output of the time variation gain amplifiers associated with each of said two amplifiers, means for resolving the resulting signals into two crossed electric fields, and means for visually depicting the magnitude and direction of the resultant of said fields.

7. An object locating system comprising a compressional wave projector, a detector responsive to reflections of waves propagated by said projector, said detector including two bidirectional electromechanical translating units and a substantially non-directional electromechanical translating unit, three balanced amplifiers each connected to a corresponding one of said units and having the same time variation gain characteristic such as to substantially compensate for variations in intensity of said reflections with distance between said detector and the object at which said reflections emanate, means in circuit with said non-direction unit for controlling said amplifiers to substantially compensate for variations in intensity of said reflections with size and configuration of said object, similar amplifiers each connected to a corresponding one of said first amplifiers, means controlling said second amplifiers to increase the gain thereof proportionately to time from the instant of propagation of a pulse by said projector, means for resolving the outputs of said second amplifiers into two crossed fields, and means for visually depicting the resultant of said two fields.

8. An object locating system comprising a projector for propagating time spaced compressional wave pulses, a detector responsive to reflections of said pulses from an object to be located, said detector comprising a pair of electromechanical translating units having predetermined directional characteristics such that the output thereof is proportional to the angle of incidence of said reflections upon said detector, means for modifying the outputs of said units equally to compensate for variations in the intensity of the reflections detected thereby with distance between said object and said detector, means for controlling said modifying means to compensate for variations in the intensity of said detected reflections with size and configuration of said object, means for further modifying the modified outputs of said units equally in proportion to the time interval between the propagation of a pulse by said projector and the detection of the corresponding reflection by said detector, and means for resolving the resulting signal into two crossed fields the resultant of which is related in direction and amplitude to the bearing and distance respectively of said object with respect to said detector.

9. An object locating system in accordance with claim 8 comprising a cathode ray device having deflector plates between which said crossed fields are established, said device including also a fluorescent screen, means for projecting an electron stream between said deflector plates and against said screen, and means for controling the intensity of said stream, and means connecting said modifying controlling means to said intensity controlling means to vary the intensity of said stream in accordance with the size and configuration of said object.

10. An object locating system comprising a projector for propagating time spaced compressional wave pulses, a detector responsive to reflections of said pulses from an object to be located, said detector comprising a pair of bidirectional translating units at substantially right angles to each other and having substantially cosine directivity and a third translating unit having a substantially non-directional response charcateristic, three balanced gain varying elements each connected to a corresponding one of said translating units, means controlling said elements to vary the gain thereof at a predetermined rate to substantially compensate for variations in the intensity of reflections with distance between said object and said detector, means associated with the element connected to said third unit for varying the gain of said three elements to compensate for variations in intensity of reflections with size and configuration of said object, three balanced gain varying elements each connected to a corresponding one of said first elements and energized thereby, means controlling said second elements to vary the gain thereof substantially in proportion to the time interval between the propagation of a pulse by said projector and the detection of the corresponding reflection by said detector, means for combining the output of the second element associated with said non-directional unit with the output of each of the other two of said second elements, means for rectifying the two combined outputs, means resolving the rectified combined outputs into two electric fields at right angles to each other, and means for visually depicting the direction and amplitude of the resultant of said fields.

No references cited.